(12) United States Patent
Takitsune

(10) Patent No.: US 11,606,276 B2
(45) Date of Patent: Mar. 14, 2023

(54) COMMUNICATION DEVICE

(71) Applicant: RENESAS ELECTRONICS CORPORATION, Tokyo (JP)

(72) Inventor: Yuichi Takitsune, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 16/827,709

(22) Filed: Mar. 24, 2020

(65) Prior Publication Data
US 2020/0322244 A1    Oct. 8, 2020

(30) Foreign Application Priority Data

Apr. 5, 2019 (JP) .............................. JP2019-072624

(51) Int. Cl.
| | |
|---|---|
| *H04L 43/0823* | (2022.01) |
| *H04W 4/40* | (2018.01) |
| *H04L 1/00* | (2006.01) |
| *H04W 28/04* | (2009.01) |
| *H04W 28/06* | (2009.01) |

(52) U.S. Cl.
CPC ........ *H04L 43/0847* (2013.01); *H04L 1/0083* (2013.01); *H04W 4/40* (2018.02); *H04W 28/04* (2013.01); *H04W 28/06* (2013.01)

(58) Field of Classification Search
CPC .. H04L 43/0847; H04L 1/0083; H04W 28/06; H04W 28/04; H04W 4/40; G06F 13/4282
See application file for complete search history.

(56) References Cited

U.S. PATENT DOCUMENTS

| | | | |
|---|---|---|---|
| 6,717,910 B1* | 4/2004 | Kasper | H04L 49/9078 710/48 |
| 9,756,154 B1* | 9/2017 | Jiang | H04L 69/22 |
| 2008/0279562 A1* | 11/2008 | Naoe | H04L 69/32 398/140 |
| 2008/0291941 A1* | 11/2008 | Sakai | G06F 9/545 370/469 |

(Continued)

FOREIGN PATENT DOCUMENTS

| | | |
|---|---|---|
| EP | 2 192 715 A2 | 6/2010 |
| JP | 2017-204083 A | 11/2017 |

OTHER PUBLICATIONS

Extended European Search Report issued in corresponding European Patent Application No. 20167419.9-1224, dated Jul. 21, 2020.

*Primary Examiner* — Syed Ali
(74) *Attorney, Agent, or Firm* — McDermott Will & Emery LLP

(57) ABSTRACT

Techniques for detecting a loss of a received frame are provided. The communication apparatus 101 includes a receiving unit 813 for receiving a frame including a plurality of data, a first memory 806 for temporarily storing a plurality of data, a second memory 811 for storing a transfer rule of each data, a plurality of third memories 809 to which each data is allocated, a processor 810 associated with each third memory 809, and a memory control unit 805 for controlling transfer of each data. The memory control unit 805 outputs an error when the first data is not the last data of the frame or the size of the first data is larger than the size defined by the second data in the case where the second data includes the last data flag.

7 Claims, 16 Drawing Sheets

(56) References Cited

U.S. PATENT DOCUMENTS

| | | | |
|---|---|---|---|
| 2008/0313518 A1* | 12/2008 | Naoe | H04L 1/16 |
| | | | 714/748 |
| 2010/0138573 A1* | 6/2010 | Sano | H04L 1/08 |
| | | | 710/106 |
| 2016/0294508 A1* | 10/2016 | Takeuchi | H04L 1/0009 |
| 2017/0230310 A1* | 8/2017 | Takeuchi | H04L 1/0067 |
| 2020/0301610 A1* | 9/2020 | Shirakura | G06F 3/0619 |
| 2020/0389469 A1* | 12/2020 | Litichever | H04L 63/029 |
| 2021/0049101 A1* | 2/2021 | Ray | G06F 3/0679 |
| 2021/0084534 A1* | 3/2021 | Kim | H04L 69/04 |

* cited by examiner

FIG. 4

| Filtering Code | a | b | c | b | d |
|---|---|---|---|---|---|
| Power Train Data | ▨ | ▨ | ▨ | ▨ | ▨ |
| Chassis Data | ▨ | | ▨ | | |
| Sensor Data | ▨ | | | | ▨ |
| Payload Of Ethernet Frame | ▨▨ | ▨ | ▨▨ | ▨ | ▨ |

COMMUNICATION DEVICE

CROSS-REFERENCE TO RELATED APPLICATIONS

The disclosure of Japanese Patent Application No. 2019-072624 filed on Apr. 5, 2019 including the specification, drawings and abstract is incorporated herein by reference in its entirety.

BACKGROUND

The present disclosure relates to a communication device, and can be suitably used, for example, in a communication apparatus of an in-vehicle network.

In recent years, research and development have been carried out on automatic driving technology for automobiles. In order to cause an automobile to automatically drive, it is necessary to process a large number of frames (hereinafter, data transmitted and received on a network is referred to as "frames") acquired by various sensors and cameras attached to the automobile without delay, and to control the entire automobile.

Along with the automatic operation of automobiles, a large number of devices are connected to the in-vehicle network, and the frame processed by the communication device increases dramatically, and the amount of data to be processed by the communication device is exceeding the processing capacity of the software of the communication device. Therefore, the communication device includes a plurality of memories and CPUs (Central Processing Unit) in order to process a large amount of data.

In order to cause each CPU to perform distributed processing, the communication apparatus divides the received frame into a plurality of pieces of data, and transmits each piece of data to a memory corresponding to each CPU. At this time, the communication apparatus divides the frame into a plurality of pieces of data on the assumption that the order and size of the payloads in the frame are fixed for each type of the received frame, and transmits these pieces of data to each memory. Therefore, when a frame received by the communication device is missing, the communication apparatus may transfer unintended data to an unintended memory. If the software of the communication device performs exception processing on all unintended data transfers, the processing becomes very complicated, and there is a possibility that a delay occurs in the data processing. Therefore, it is desirable to transfer data and control errors by hardware.

[Patent Document 1] Japanese Patent Application Publication No. 2017-204083

Regarding the transfer of data, for example, Patent Document 1 discloses a system in which "when the application program to be executed is switched, DMAC refers to the data for setting the memory region including the area data corresponding to the next application program from the TCM to store the area data to be executed, and transfers the data directly to the register of the MPU to perform memory protection".

SUMMARY

According to the art disclosed in Patent Document 1, error control for frame loss cannot be performed. Therefore, even when a frame loss occurs, the communication apparatus continues processing in a state in which unintended data is transferred to an unintended memory. In order to prevent such a state, each CPU included in the communication apparatus needs to execute exception processing by software, and as a result, the processing capacity of the communication apparatus is lowered. Therefore, there is a need for a technique that provides error control for frame loss. The present disclosure has been made in view of the above-described background, and provides a technique for performing error control for frame loss in some aspects.

Other objects and novel features will become apparent from the description of this specification and the accompanying drawings.

According to one embodiment, the communication apparatus includes a receiving unit for receiving a frame including a plurality of data, a first memory for temporarily storing a plurality of data, a second memory for storing a transfer rule of each of the plurality of data, a plurality of third memories to which the plurality of data are respectively allocated, and a memory control unit for allocating each of the plurality of data to each of the plurality of third memories in order from the head thereof. The memory control unit outputs an error when the data acquired from the first memory is not the last data of the frame or the size of the data acquired from the first memory is larger than the size defined by the second data in the case where the second data includes the last data flag.

According to the above embodiment, the communication apparatus can detect a loss of a frame.

BRIEF DESCRIPTION OF THE DRAWINGS

FIG. 4 is a diagram showing an example of the type of frame.

DETAILED DESCRIPTION

Figure 1:
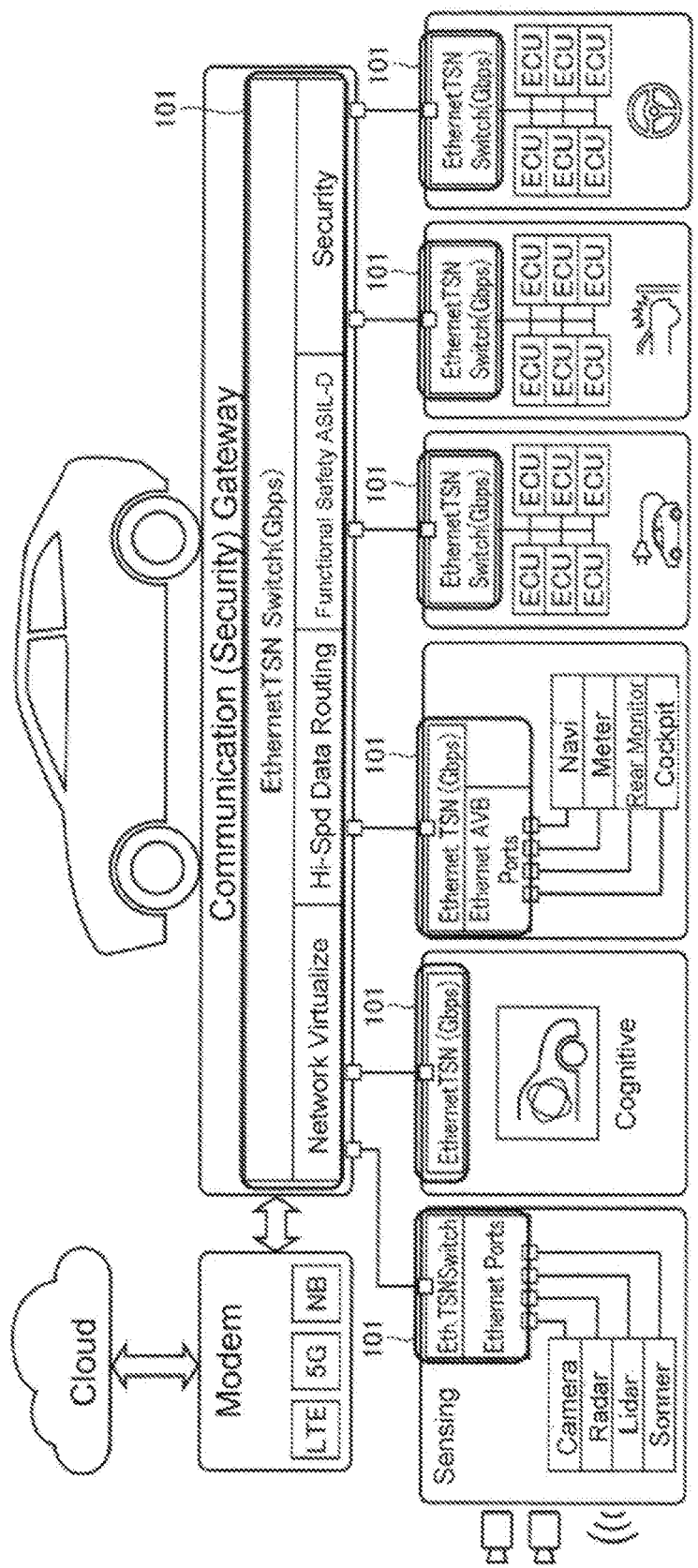
FIG. 1 is a diagram showing an example of a configuration of an in-vehicle network.

Hereinafter, each embodiment will be described in detail with reference to the drawings. The same or corresponding portions are denoted by the same reference numerals, and description thereof will not be repeated.

FIG. 1 is a diagram showing an example of a configuration of an in-vehicle network. The in-vehicle network is configured by connecting a plurality of communication apparatuses 101 to each other. A wide variety of devices such as cameras, radars, LiDAR (Light Detection and Ranging, chassis, and powertrains are connected to each communication device 101, and each communication device 101 processes frames received from these devices. The communication apparatus 101 is connected to an external network and can cooperate with a cloud service. Since the communication apparatus 101 needs to process and transfer various data without delay, the communication apparatus 101 includes a plurality of CPUs and memories. The communication apparatus 101 further includes a memory control unit that divides the received frame into a plurality of pieces of data and allocates the data to each memory. Next, details of the communication apparatus 101 will be described.

Figure 2:
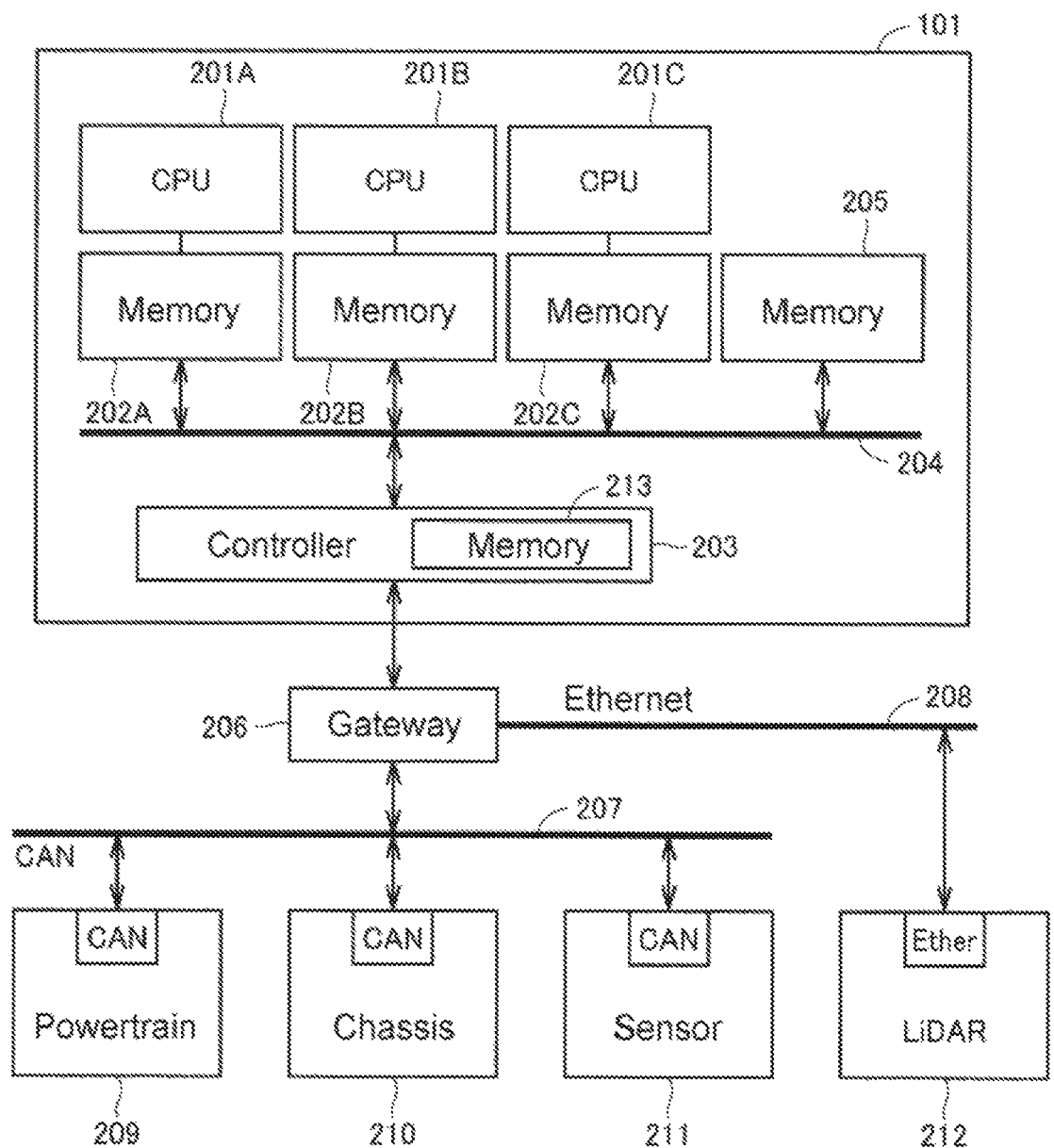
FIG. 2 is a diagram showing an example of the configuration of the communication apparatus 101.

FIG. 2 is a diagram showing an example of the configuration of the communication apparatus 101. The communication device 101 includes CPU201A, 201B, and 201C (hereinafter collectively referred to as "CPU201"), memories 202A, 202B, and 202C (hereinafter collectively referred to as "memory 202"), a controller 203, a bus 204, and a memory 205.

The communication device 101 is connected to a CAN (Controller Area Network) 207 and an Ethernet (registered trademark) 208 via gateways 206. Further, the communication device 101 is connected to the powertrain 209, the chassis 210, and the sensors 211 via a CAN207. The communication device 101 is connected to LiDAR212 via the Ethernet 208.

Note that the configuration of FIG. 2 is an example, and the configuration of the communication apparatus 101 is not limited to this. In certain aspects, the number of CPU201 and memories 202 may be one, two, or four or more. Also in another aspect, the power train 209 and the sheath 210 and the sensor 211 may be connected to the easer net 208, and LiDAR212 may be connected to CAN207. In other aspects, any device other than the powertrain 209, chassis 210, sensors 211, and LiDAR212 may communicate with the communication device 101.

CPU201 is associated with the memory 202, and CPU201A, 201B, and 201C process the data stored in the memories 202A, 202B, and 202C, respectively.

The memory 202 is implemented by a random access memory (Random Access Memory) that stores data received from the controller 203 via the bus 204. In some aspects, the memories 202 may be DRAM (Dynamic Random Access Memory) or SRAM (Static Random Access Memory).

The controller 203 divides the frame acquired from the gateway 206 into a plurality of pieces of data. The controller 203 transfers the divided data to each memory 202 via the bus 204. The controller 203 also includes a memory 213. In some aspects, the memory 213 may be external to the controller 203. The controller 203 uses the memory 213 as a FIFO (First In First Out memory.

The memory 205 stores a transfer rule defining an address and the like in the memory of the transfer destination for each data included in each frame. The controller 203 determines the data transfer destination by referring to the transfer rule of the memory 205. In certain aspects, transfer rules may be included in the file descriptor. The memory 205 stores a file descriptor chain which is a continuous file descriptor.

The gateway 206 receives frames from various devices, and transfers the received frames to the communication apparatus 101. The gateway 206 transmits the frame received from the communication apparatus 101 to another apparatus.

In some aspects, the communication device 101 may be SoC (System-on-a-Chip), FPGA (Field Programmable Gate Array, and ASIC (Application Specific Integrated Circuit), or combinations thereof.

Figure 3:
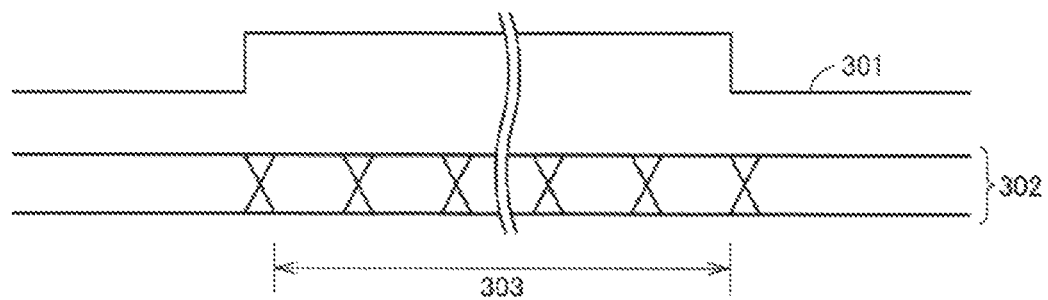
FIG. 3 is a diagram showing an example of a signal flowing through a communication path such as the Ethernet 208 of FIG. 2.

FIG. 3 is a diagram showing an example of a signal flowing through a communication path such as the Ethernet 208 of FIG. 2. The signal 301 is a signal for synchronization. Signal 302 is a data signal. The communication device 101 and the gateways 206 capture the signal 303 detected by the signal 301 during HIGH period as a part of the frame. The communication device 101 and the gateway 206 may capture the signal 303 multiple times and process them as a frame.

FIG. 4 is a diagram showing an example of the type of frame. The table 400 includes an example of an Ethernet frame flowing through the Ethernet 208 of FIG. 2. Each frame is assigned a filtering code. The types of data included in the frame include "powertrain data", "chassis data" and "sensor data". These data may be included in the payload of the frame.

In the table 400, for example, the frame of the filtering code "a" includes "powertrain data", "chassis data" and "sensor data" in the payload. The frame of the filtering code "c" includes "powertrain data" and "chassis data" in the payload. Thus, a frame may include one or more data in the payload for each type defined by the filtering code.

Note that these data are examples, and a frame may include more types of data. For the sake of visual clarity, the table 400 describes a block in each column. When the communication device 101 stores the table 400, the table 400 may include alphanumeric or binary data instead of blocks.

Figure 5:
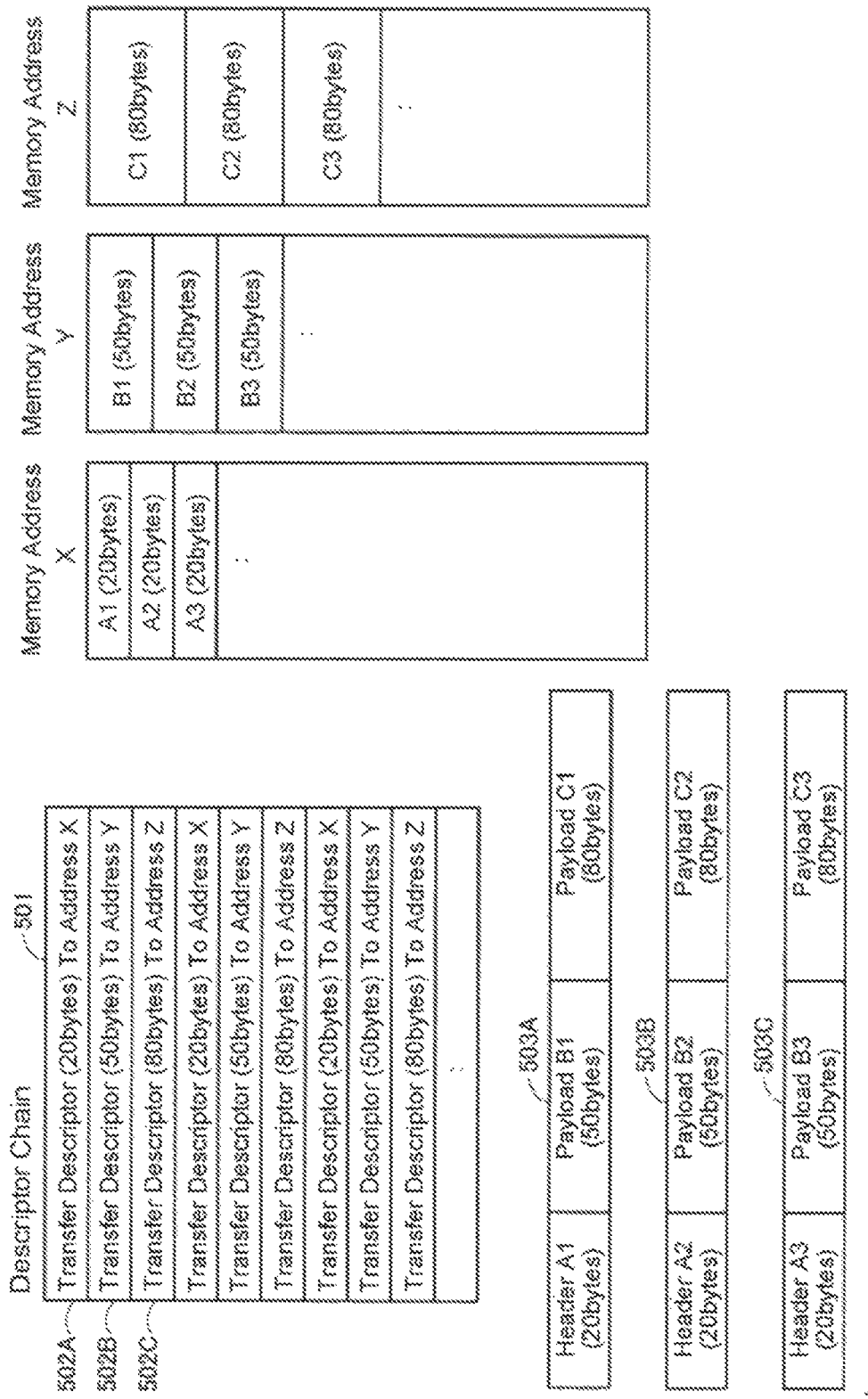
FIG. 5 is a diagram showing an example of transfer of data in a frame in the communication apparatus 101.

FIG. 5 is a diagram showing an example of transfer of data in a frame in the communication apparatus 101. The descriptor chain 501 is stored in the memory 205. The memory addresses X, Y, and Z are addresses in the respective memories 202. The data transferred to the memory addresses X, Y, and Z are processed by CPU201 corresponding to the memory 202.

Assume that the controller 203 receives the frames 503A, 503B, and 503C. Each frame includes a plurality of data. For example, the frame 503A includes a header A1, a payload B1, and a payload C1. For the sake of simplicity, in the illustration of FIGS. 5 to 7, the type of frame is assumed to be one.

The controller 203 transfers a plurality of pieces of data included in the frame to the memory addresses X, Y, and Z. The controller 203 refers to the descriptor chain 501 in order to determine the address in the memory of the transfer destination of each data.

Upon receiving the frame, the controller 203 stores the frame in the memory 213. The data in the memory 213 are processed in the order stored in the memory 213. Next, the controller 203 refers to the descriptor chain 501. The descriptor chain 501 includes successive descriptors, and each descriptor includes a transfer rule that specifies how many bytes of data to transfer next to which address.

The controller 203 refers to the descriptor chain 501 from the head. The controller 203 first refers to the first descriptor 502A. The descriptor 502A includes a transfer rule "Transfer 20 bytes to address X". Therefore, the controller 203 acquires the 20-byte data "header A1 (20 bytes)" from the memory 213 and transfers it to the memory address X. The controller 203 stores the transfer result in the descriptor 502A. The transfer result may also include error information.

Next, the controller 203 refers to the second descriptor 502B. The descriptor 502B includes a transfer rule "transfer 50 bytes to address Y". Therefore, the controller 203 acquires the 50-byte data "payload B1 (50 bytes)" from the memory 213 and transfers it to the memory address Y. The controller 203 stores the transfer result in the descriptor 502B.

Next, the controller 203 refers to the third descriptor 502C. The descriptor 502C includes a transfer rule "transfer 80 bytes to address Z". Therefore, the controller 203 acquires 80-byte data "payload C1 (80 bytes)" from the memory 213, and transfers the data to the memory address Z. The controller 203 stores the transfer result in the descriptor 502C.

Similarly, the controller 203 sequentially refers to the descriptor, and transfers the data in the frames 503B and 503C to any one of the memory addresses X, Y, and Z.

The controller 203 sequentially refers to the descriptors from the top of the descriptor chain 501, and can determine the number of descriptors to be referred to by checking the transfer result of each descriptor. For example, if the descriptor 502A includes the transfer result "successful writing of 20 bytes of data to the memory address X" and the transfer result of the descriptor 502B is not input, the controller 203 may refer to the descriptor 502B.

As described above, the controller 203 transfers the data included in the received frame to each memory 202 in accordance with the transfer rule defined in the descriptor. The transfer using the descriptor is based on the assumption that the frame size corresponding to the descriptor chain 501 is fixed. Therefore, if the controller 203 receives a missing frame of data, a problem may occur. Next, a problem in the case where the controller 203 receives a frame in which data is lost will be described.

Figure 6:
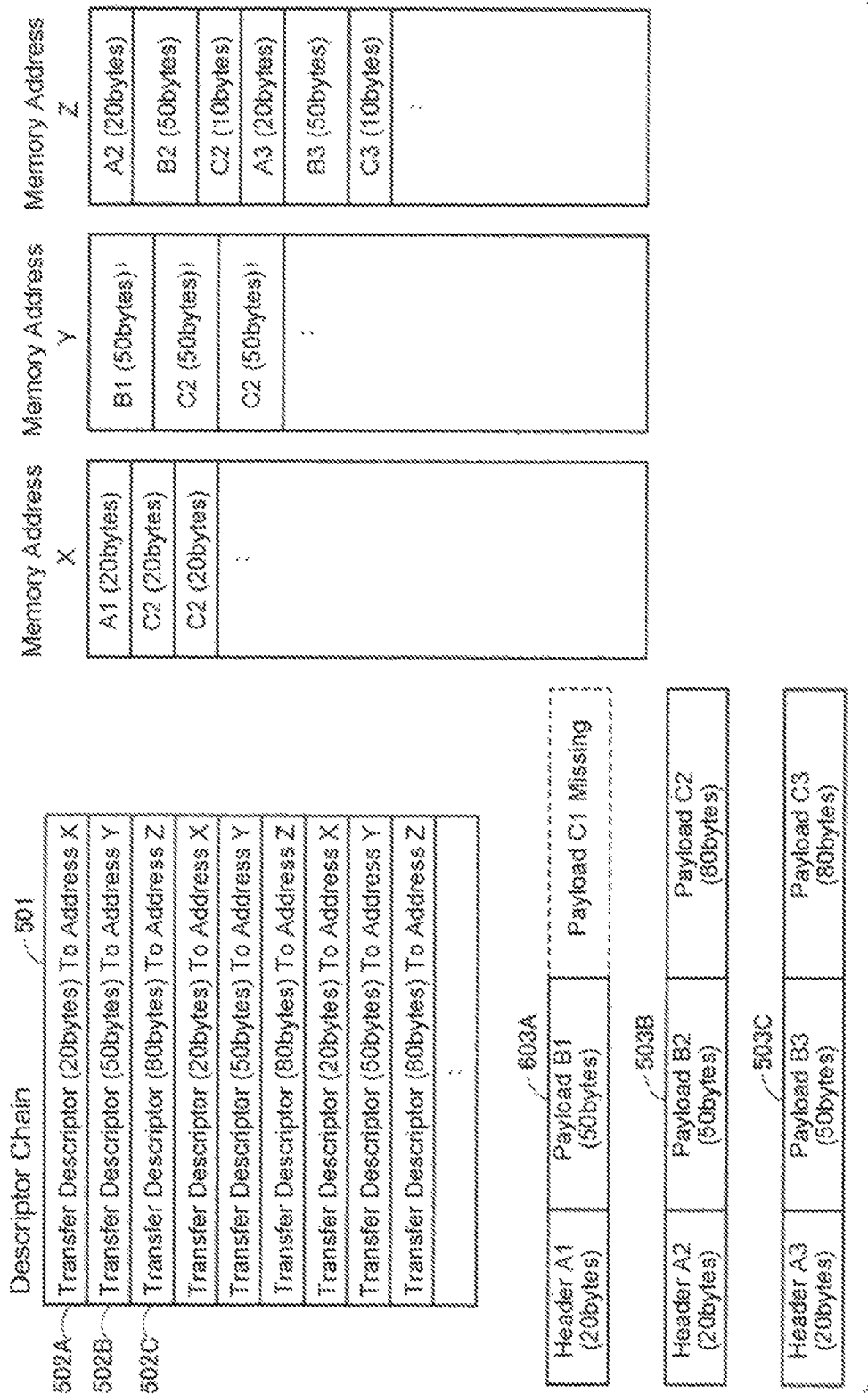
FIG. 6 is a diagram showing an example of transfer of data in a missing frame in the communication apparatus 101.

FIG. 6 is a diagram showing an example of transfer of data in a missing frame in the communication apparatus 101. Similar to the illustration of FIG. 5, descriptor chain 501 is stored in memory 205. The memory addresses X, Y, and Z are addresses in the respective memories 202. The data transferred to the memory addresses X, Y, and Z are processed by CPU201 corresponding to the memory 202.

Assume that the controller 203 receives the frames 603A, 503B, and 503C. It is assumed that the frame 603A is missing and does not include the payload C1 that should be originally included. For the sake of simplicity, it is assumed that the type of frame is one. Upon receiving the frame, the controller 203 stores the frame in the memory 213. Next, the controller 203 refers to the descriptor chain 501.

The controller 203 refers to the descriptor chain 501 from the head. The controller 203 refers to the descriptor 502A, acquires the 20-byte data "header A1" from the memory 213, and transfers the data to the memory address X. Next, the controller 203 refers to the descriptor 502B, acquires the 50-byte data "payload B1" from the memory 213, and transfers it to the memory address Y.

Next, the controller 203 refers to the descriptor 502C, acquires 80-byte data "payload C1" from the memory 213, and transfers it to the memory address Z. However, since the payload C1 of the frame 603A is missing, the data acquired next by the controller 203 from the memory 213 becomes the data of the frame 503B.

The controller 203 cannot detect that the payload C1 is missing. Therefore, the controller 203 acquires "header A2 (20 bytes)", "payload B2 (50 bytes)" and "payload C2 (10 bytes)" as 80-byte data from the memory 213 according to the transfer rule "transfer 80 bytes to address Z" of the descriptor 502C, and transfers them to the memory address Z. As a result, unexpected data is transferred to the memory address Z. The controller 203 cannot detect that a shift has occurred in the transferred data. Therefore, after that, the controller 203 continues the transfer of the data of each frame while the data acquired from the memory 213 is shifted.

Conventionally, exceptional processes of programs executed by CPU201 detect a deviation of data caused by a loss of a frame, and restore the data. However, this exception processing is complicated and may cause a decrease in the execution speed of the program. Therefore, it is desirable to detect the deviation of the data without using the programs executed by CPU201.

Figure 7:
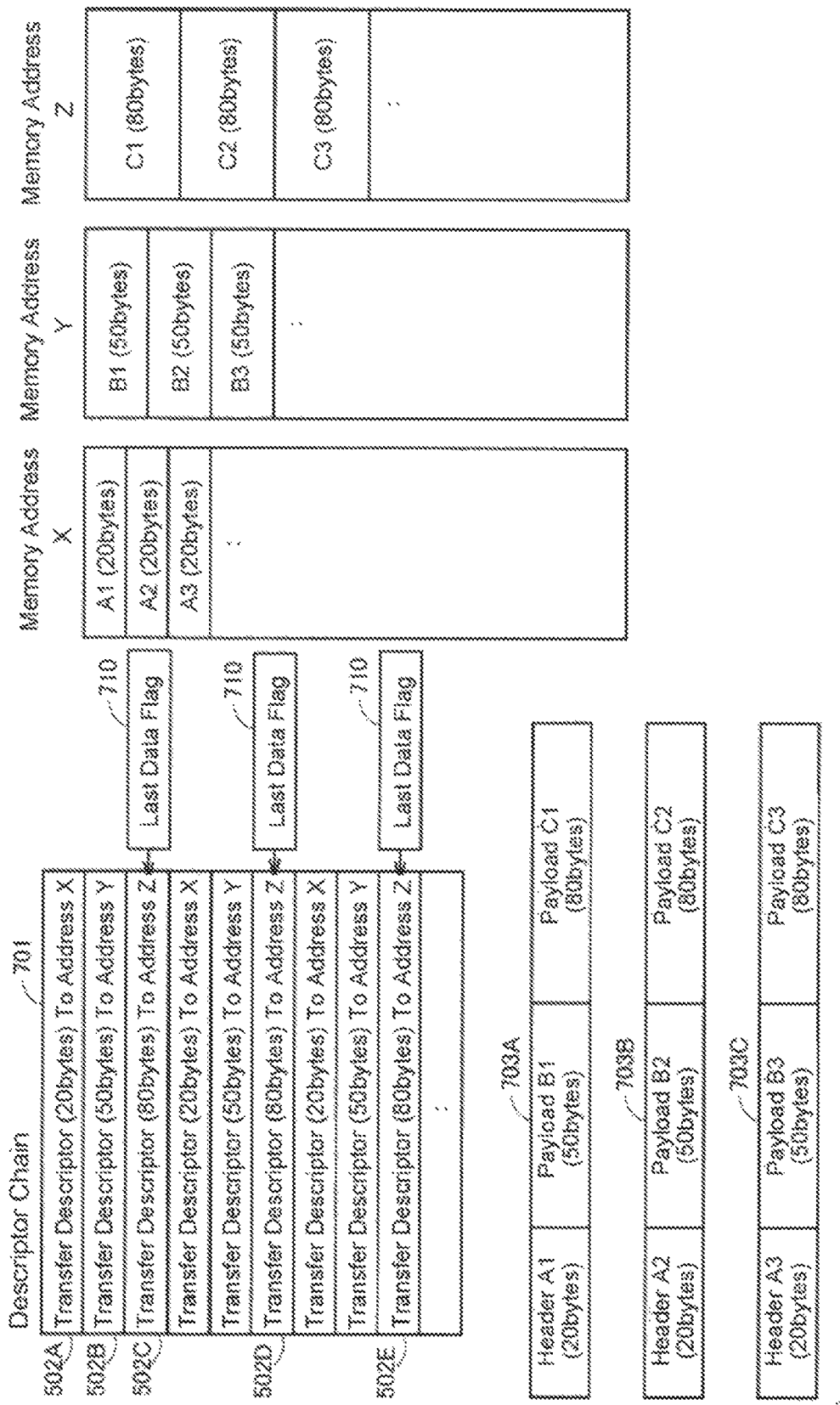
FIG. 7 is a diagram showing an example of transfer of data in a frame using the last data flag in the communication apparatus 101.

In order to solve the above-mentioned problems, the descriptor according to the present embodiment includes a final data flag capable of determining whether or not the data to be transferred next is the final data of the frame, thereby realizing the detection of the deviation of the data by the controller 203. Referring to FIG. 7, the operation of the communication apparatus 101 when the descriptor includes the final data flag will be described.

FIG. 7 is a diagram showing an example of transfer of data in a frame using the last data flag in the communication apparatus 101. In the descriptor chain 501 according to the present embodiment, the descriptor corresponding to the last data of the frame includes the "last data flag 710". In the example shown in FIG. 7, descriptors 502C, 502D, and 502E include a "last data flag 710".

Similar to the illustration of FIG. 5, descriptor chain 501 is stored in memory 205. The memory addresses X, Y, and Z are addresses in the respective memories 202. The data transferred to the memory addresses X, Y, and Z are processed by CPU201 corresponding to the respective memories.

In one aspect, controller 203 receives frames 703A, 703B, and 703C. For the sake of simplicity, it is assumed that the type of frame is one. Upon receiving the frame, the controller 203 stores the frame in the memory 213. Next, the controller 203 refers to the descriptor chain 501.

The controller 203 refers to the descriptor chain 501 from the head. First, the controller 203 refers to the descriptor 502A and confirms that the descriptor 502A does not include the "last data flag 710". Next, the controller 203 determines whether or not the data to be acquired from the memory 213 (hereinafter referred to as "next data") is the last data of the frame.

If the next data is not the last data of the frame, the controller 203 transfers the next data to the memory address X, and stores the normal transfer result in the descriptor 502A. When the next data is the last data of the frame, since the contents of the descriptor 502A do not match the contents of the next data, the controller 203 suspends the transfer of the data, and stores the transfer result including the error in the descriptor 502A.

The controller 203 adds judgment information indicating the head or the end of the frame before and after the frame 503, and stores the judgment information in the memory 213. In one aspect, the controller 203 may add both the judgment information indicating the start of the frame and the judgment information indicating the end of the frame before and after the frame 503, and may store the result in the memory 213.

Further, the controller 203 counts the size of data input to and output from the memory 213. Therefore, the controller 203 can detect whether or not the next data is the last data of the frame by checking whether or not the determination information is included at the end of the next data. Further, the controller 203 can compare the size of the transfer data defined in the transfer rule of the descriptor with the size of the next data to determine whether or not the last data is missing.

Next, the controller 203 refers to the descriptor 502B and confirms that the descriptor 502A does not include the "last data flag 710". Next, the controller 203 determines whether or not the next data is the last data of the frame.

When the next data is not the last data of the frame, the controller 203 transfers the next data to the memory address Y, and stores the normal transfer result in the descriptor 502B. If the next data is the last data of the frame, the controller 203 suspends the transfer of the data and stores the transfer result including the error in the descriptor 502B.

Next, the controller 203 refers to the descriptor 502C and confirms that the descriptor 502A includes the "last data flag 710". Next, the controller 203 determines whether or not the next data is the last data of the frame.

When the next data is the last data of the frame and the size of the next data is normal, the controller 203 transfers the data to the memory address Z and stores the normal transfer result in the descriptor 502C. If the next data is not the last data of the frame or the size of the next data is not normal, the controller 203 suspends the transfer of the data and stores the transfer result including the error in the descriptor 502C. In determining the size of the final data, the controller 203 may determine that the size of the final data is normal when the size of the final data matches the size of the transfer data defined in the transfer rule of the descriptor 502C. The controller 203 may determine that the size of the final data is normal when the size of the final data is within the size of the transfer data defined by the transfer rule of the descriptor 502C. Since the controller 203 counts the size of the data to be input and output to the memory 213, it is possible to calculate the size of the final data in conjunction with the determination information.

In the example of FIG. 7, when the frame 503A is normal, when the controller 203 refers to the descriptor 502C including the "last data flag 710", the next data includes the determination information at the end, and the size of the next data is 80 bytes.

However, when a part of the frame 503A is missing, the controller 203 can detect the loss of the frame without fail because the next data includes the determination information when the controller 203 refers to the descriptors 502A and 502B or the size of the next data is not normal when the controller 203 refers to the descriptor 502C.

In this embodiment, the controller 203 stores an error in the descriptor when a frame loss is detected, but in some aspects, the controller 203 may generate error interrupt signals to interrupt CPU201 process. The controller 203 may execute both of these processes.

As described above, since the descriptor corresponding to the last data of the frame has the last frame flag, the controller 203 can detect a loss of data in units of frames without fail. As a result, the communication device 101 does not require to allocate CPU201 resources for error-detection processing, and the processing performance of the communication apparatus 101 is improved.

Figure 8:
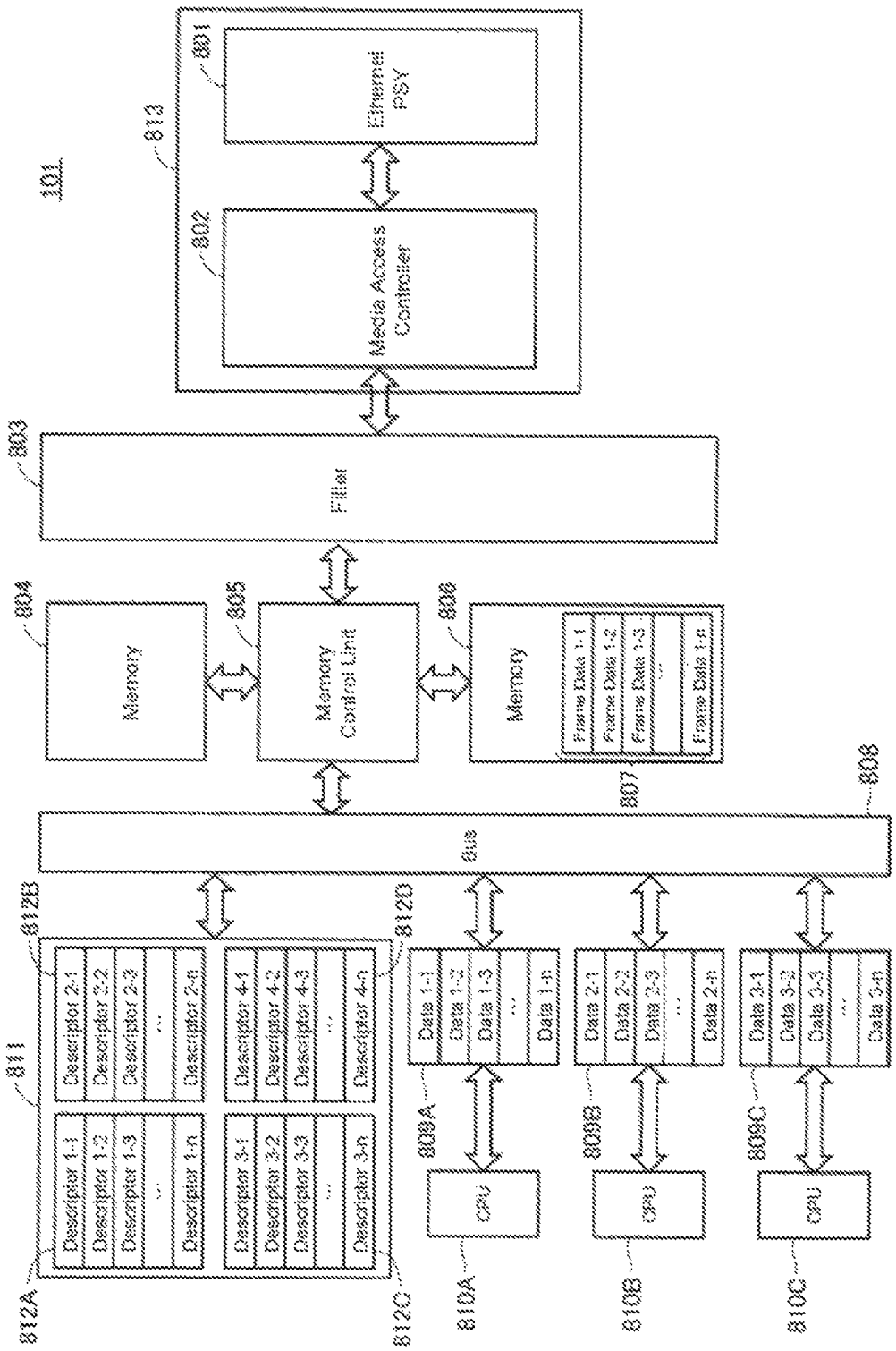
FIG. 8 is a diagram showing an example of a more detailed configuration of the communication apparatus 101.

FIG. 8 is a diagram showing an example of a more detailed configuration of the communication apparatus 101. The communication device 101 includes an Ethernet PHY801, a media access controller 802, filters 803, memories 804 and 806, a memory controller 805, a bus 808, memories 809A, 809B, and 809C (hereinafter collectively referred to as "memory 809"), CPU810A, 810B, and 810C (hereinafter collectively referred to as "CPU810"), and a memory 811. The communication device 101 transmits and receives a plurality of types of frames, and causes CPU810 to process data included in the frames in a distributed manner. The Ethernet PHY801, the media access controller 802, the filters 803, the memories 804 and 806, and the memory control unit 805 correspond to the controller 203. The memory control unit 805 uses the memories 804 and 806 as FIFO memories.

The memory 811 includes a plurality of descriptor chains 812A, 812B, 812C, 812D (hereinafter collectively referred to as "descriptor chains 812"). Unlike the examples of FIGS. 5 to 7, the communication apparatus 101 receives a plurality of types of frames. Each descriptor chain 812 is assigned to a respective type of frame.

The Ethernet PHY801 transmits and receives signals on the Ethernet. The media access controller 802 converts the signals received by the Ethernet PHY801 into a frame format and transmits the frame format to the filters 803. The Ethernet PHY801 and Media Access Controller 802 processes the signals and data of the network interface layers of the so-called TCP/IP (Transmission Control Protocol/Internet Protocol). Hereinafter, the Ethernet PHY801 and the media access controller 802 are collectively referred to as a communication unit 813.

The filter 803 determines the type of the received frame. The filter 803 transmits the filtering code and the address of the descriptor chain corresponding to the filtering code to the memory control unit 805 based on the type of the frame. The filter 803 transmits the frame to the memory control unit 805. The filter 803 may transmit only the frame and the address of the descriptor chain to the memory control unit 805. The memory control unit 805 may acquire the filtering code from the filter 803, and the memory control unit 805 may determine the address of the descriptor chain corresponding to the filtering code based on the filtering code.

In certain aspects, filter 803 may determine the filtering code from any of the data contained in the frame size, header, and payload. Also, in some aspects, for example, the filter 803 may store the table 400 and determine the filter and select the filtering code based on the table 400. In this case, the filter 803 stores the respective addresses of the descriptor chains 812 associated with the respective filtering codes in the table 400.

The memory 806 temporarily stores the frame received by the communication apparatus 101. Upon receiving a plurality of frames, the memory control unit 805 sequentially stores the frames in the memory 806 as temporary data 807. The memory control unit 805 counts the size of data input to and output from the memory 806. The frame stored in the memory 806 is divided into a plurality of pieces of data by the memory control unit 805, and further allocated to any one of the memories 809. The memory 804 temporarily stores a frame transmitted by the communication apparatus 101.

The memory control unit 805 stores the frame in the memory 806 in addition to the judgment information indicating that the frame is the head or the end before and after the frame. When a plurality of frames are received, the memory control unit 805 similarly adds determination information to each frame and stores the result in the memory 806. In one aspect, the memory controller 805 may store the positions of the head and the tail of a frame in the memory 806 as determination information in a register (not shown). In this case, when acquiring the data from the memory 806, the memory control unit 805 can determine whether or not the data acquired from the memory 806 is the last data of the frame by referring to the determination information of the register.

Next, the memory control unit 805 refers to the address of the descriptor chain corresponding to the filtering code, and acquires the transfer rule. Based on the acquired transfer rule, the memory control unit 805 acquires data of the number of bytes defined in the transfer rule from the memory 806.

Next, the memory control unit 805 transfers the data acquired from the memory 806 to one of the transfer destination memories 809 defined in the transfer rule. Finally, the memory control unit 805 stores the transfer result in the referenced descriptor. In one aspect, the memory controller 805 may be a DMAC (Direct Memory Access Controller.

The bus 808 interconnects the memory control unit 805, the memory 809, and the memory 811. The memory control unit 805 communicates with these memories 809 and 811 via the bus 808.

Each of the memories 809 is a RAM, and stores data allocated from the memory control unit 805. CPU810 is allocated to any of the memories 809. CPU810 processes the data stored in the memory 809.

The memory 811 stores a plurality of descriptor chains 812. A descriptor chain 812 is associated with each frame filtering code. For example, referring to table 400, descriptor chains 812A, 812B, 812C, 812D are associated with filtering codes "a, b, c, d", respectively.

By referring to the addresses of the descriptor chains 812 received from the filters 803, the memory control unit 805 can distribute the data obtained by dividing the frame into a plurality of frames to each of the memories 809, and distribute the distributed data to CPU810.

In one aspect, upon activation of the communication device 101, any of CPU910 may execute programs for writing the descriptor chain 812 in the memory 911. In this instance, the communication device 101 may include a ROM (Read Only Memory) (not shown) such as a flash memory for storing the programs.

As described above, in the communication device 101, the filter 803 determines the type of the frame, the memory control unit 805 allocates data to each memory 812 by referring to the descriptor chain 812, and CPU810 distributes the data allocated to each memory 809.

Figure 9:
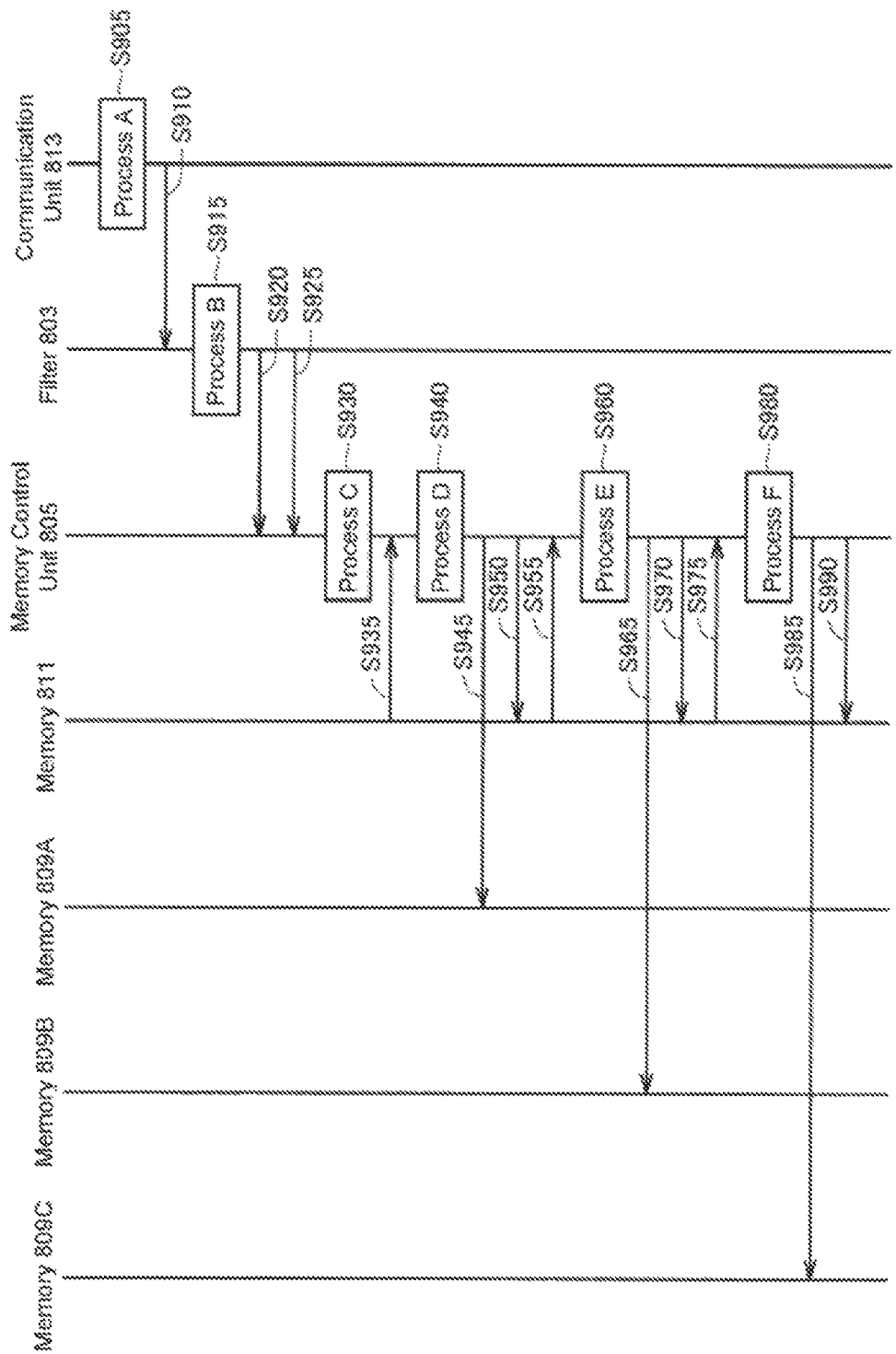
FIG. 9 is a diagram showing an example of communication processing of the communication apparatus 101.

FIG. 9 is a diagram showing an example of communication processing of the communication apparatus 101. With reference to FIG. 9, the processing at the time of receiving a frame by the communication apparatus 101 in an environment in which a plurality of types of frames are transmitted and received will be described.

In step S905, the communication unit 813 receives signals. Communication unit 813 may receive signals from appliances such as, for example, powertrain 209, chassis 210, sensors 211, and a LiDAR212.

In step S910, the communication unit 813 converts the received signal into a frame format, and transmits the frame to the filter 803. In certain aspects, the frames may be in the form of TCP/IP packets or may follow any other format.

In step S915, the filter 803 analyzes the received frame and determines the type of the frame. The frame may include a correspondence table, not shown, of the filtering code and the address of the descriptor chain 812 corresponding to the filtering code. For example, the correspondence table may be obtained by adding the address of the descriptor chain 812 to the table 400. The filter 803 determines the filtering code from any of the size of the frame, the header, and the data included in the payload, and acquires the address of the descriptor chain 812 from the correspondence table.

In step S920, the filter 803 transmits the frame to the memory control unit 805. In step S925, the filter 803 transmits the frame filtering code and the address of the descriptor chain 812 corresponding to the filtering code to the memory control unit 805.

In step S930, the memory control unit 805 temporarily stores the received frame in the memory 806. At this time, the memory control unit 805 adds the judgment information indicating the head or the end of the frame before and after the frame, and stores the frame in the memory 806. Alternatively, the memory control unit 805 may store the positions of the head and the tail of the frame in the memory 806 as the determination information in the register.

In step S935, the memory control unit 805 refers to the addresses of the descriptor chains 812 received from the filters 803. In the example shown in FIG. 9, the address of the descriptor chain 812 received from the filter 803 is the head address of one of the descriptor chains 812A, 812B, 812C, and 812D.

It is assumed that the address of the descriptor chain 812 received from the filters 803 in the step S935 is the head address of the descriptor chain 812A. The memory control unit 805 acquires the transfer rule of the first "descriptor 1-1" of the descriptor chain 812A.

In step S940, the memory control unit 805 determines whether or not "descriptor 1-1" includes the last data flag. The memory control unit 805 determines whether or not the next data, i.e., the data acquired from the memory 806, is the last data of the frame based on whether or not the next data includes the determination information.

When "Descriptor 1-1" does not include the last data flag and the next data is not the last data of the frame, the memory control unit 805 shifts the control to the step S945.

In the case where "descriptor 1-1" includes the last data flag, when the next data is the last data of the frame, the memory control unit 805 refers to the size of the data defined in the transfer rule, and determines whether or not the size of the next data is equal to or smaller than the size of the data defined in the transfer rule. When the size of the next data is equal to or smaller than the size of the data specified by the transfer rule, the memory control unit 805 determines that the next data is normal final data, and shifts the control to step S945.

When the size of the next data is larger than the size of the data defined by the transfer rule, the memory control unit 805 determines that the next data is abnormal, and performs predetermined error processing. Note that the memory control unit 805 may determine whether or not the next data is normal based on whether or not the size of the data defined in the transfer rule matches the size of the next data. Since the memory control unit 805 counts the size of data to be input/output to/from the memory 806, the memory control unit 805 can calculate the size of the next data from the determination information of the next data and the count number when the next data is taken out from the memory 806.

Otherwise, the memory control unit 805 performs error processing. In the error processing, the memory control unit 805 may store a transfer result including an error in the "descriptor 1-1", may output an error interrupt signal, or may execute both of these processes.

In step S945, the memory control unit 805 stores the following data in the addresses in the memory 809A defined by the "descriptor 1-1". The subsequent data stored in the memory 809A is processed by CPU810A.

In step S950, the memory control unit 805 stores the transfer result of the next data in the "descriptor 1-1". When the subsequent data is the last data of the frame, the memory control unit 805 shifts the control to the step S930.

In step S955, the memory control unit 805 advances the referenced descriptor by one in the descriptor chain 812. In step S955, the memory control unit 805 acquires the transfer rules of the "descriptor 1-2".

In step S960, the memory control unit 805 determines whether or not the "descriptor 1-2" includes the last data flag. The memory control unit 805 determines whether or not the next data is the last data of the frame.

In the case where "descriptor 1-2" includes the last data flag, when the next data is the last data of the frame, the memory control unit 805 refers to the size of the data defined in the transfer rule, and determines whether or not the size of the next data is equal to or smaller than the size of the data defined in the transfer rule. When the size of the next data is equal to or smaller than the size of the data specified by the transfer rule, the memory control unit 805 determines that the next data is normal final data, and shifts the control to step S965.

When the size of the next data is larger than the size of the data defined in the transfer rule, the memory control unit 805 determines that the next data is abnormal and performs error processing. Note that the memory control unit 805 may determine whether or not the next data is normal based on whether or not the size of the data defined in the transfer rule matches the size of the next data.

Otherwise, the memory control unit 805 performs error processing. In the error processing, the memory control unit 805 may store a transfer result including an error in the "descriptor 1-2", may output an error interrupt signal, or may execute both of these processes.

In step S965, the memory control unit 805 stores the following data in the addresses in the memory 809B defined by the "descriptor 1-2". The subsequent data stored in the memory 809B is processed by CPU810B.

In step S970, the memory control unit 805 stores the transfer result of the next data in the "descriptor 1-2". When the subsequent data is the last data of the frame, the memory control unit 805 shifts the control to the step S930.

In step S975, the memory control unit 805 advances the referenced descriptor by one in the descriptor chain 812. In step S975, the memory control unit 805 acquires the transfer rules of the "descriptor 1-3".

In step S980, the memory control unit 805 determines whether or not the "descriptor 1-3" includes the last data flag. The memory control unit 805 determines whether or not the next data is the last data of the frame.

In the case where "descriptor 1-3" includes the last data flag, when the next data is the last data of the frame, the memory control unit 805 refers to the size of the data defined in the transfer rule, and determines whether or not the size of the next data is equal to or smaller than the size of the data defined in the transfer rule. When the size of the next data is equal to or smaller than the size of the data specified by the transfer rule, the memory control unit 805 determines that the next data is normal final data, and shifts the control to step S965.

When the size of the next data is larger than the size of the data defined in the transfer rule, the memory control unit 805 determines that the next data is abnormal and performs error processing. Note that the memory control unit 805 may determine whether or not the next data is normal based on whether or not the size of the data defined in the transfer rule matches the size of the next data.

Otherwise, the memory control unit 805 performs error processing. In the error processing, the memory control unit 805 may store a transfer result including an error in the "descriptor 1-3", may output an error interrupt signal, or may execute both of these processes.

In step S985, the memory control unit 805 stores the following data in the addresses in the memory 809C defined by the "descriptors 1-3". The subsequent data stored in the memory 809C is processed by CPU810C.

In step S990, the memory control unit 805 stores the transfer result of the next data in the "descriptor 1-3". When the subsequent data is the last data of the frame, the memory control unit 805 shifts the control to the step S930.

If the number of data included in the frame is three, the memory control unit 805 allocates all the data included in the frame to the memory 809 by the processes from step S935 to step S990.

In the processing described referring to FIG. 9, the memory control unit 805 executes the processing of steps S935 to S990 in units of frames. For example, it is assumed that the communication apparatus 101 receives "frame A" and "frame B". Filter 803 sends "frame A" and "frame B" to memory 806. Further, the filter 803 transmits "address A of the descriptor chain 812" to the memory control unit 805 based on the filtering code of "frame A". The filter 803 transmits "address B of the descriptor chain 812" to the memory control unit 805 based on the filtering code of "frame B".

The memory control unit 805 stores "frame A" and "frame B" in the memory 806. Then, the memory control unit 805 determines the descriptor chain 812 to be referred to based on the "address A of the descriptor chain 812". Next, the memory control unit 805 executes the processes after S935 of steps until the final data of the "frame A" is acquired.

After allocating all the data included in the "frame A" to the memory 809, the memory control unit 805 determines the descriptor chain 812 to be referred to based on the "address B of the descriptor chain 812". After that, the memory control unit 805 similarly executes the processes of step S935 and subsequent steps until the memory control unit 805 acquires the final data of the "frame B".

As in the example of FIG. 7, the memory control unit 805 adds judgment information indicating the head or the end of the frame before and after the frame, and stores the judgment information in the memory 806. Alternatively, the memory control unit 805 may store the positions of the head and the tail of the frame in the memory 806 as the determination information in the register.

Further, the memory control unit 805 counts the size of data to be input/output to/from the memory 806, and stores the data in the memory 806. Therefore, the memory control unit 805 can determine whether or not the next data is the normal last data of the frame by checking whether or not the determination information is included at the end of the next data and checking the size of the next data.

In the processing of FIG. 9, the communication apparatus 101 can transmit and receive data at any time. For example, the memory control unit 805 may receive the message of the step S920 and the step S925 even while executing the process after the step S930.

Figure 10:
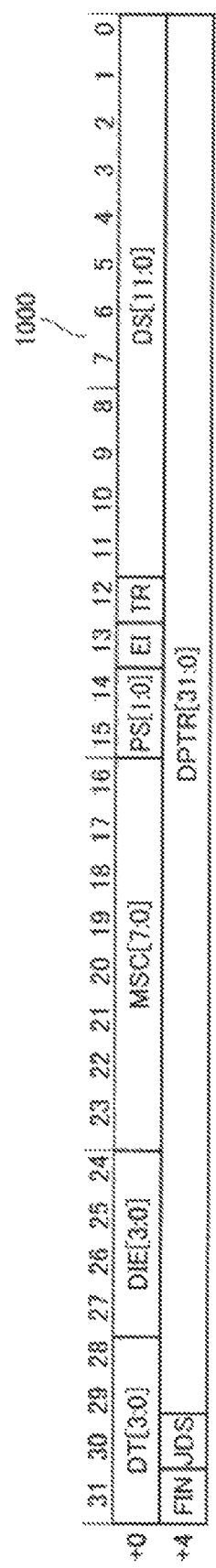
FIG. 10 is a diagram showing an example of the format of the descriptor 1000.

FIG. 10 is a diagram showing an example of the format of the descriptor 1000. The transfer rule according to the present embodiment includes data defined by the descriptor 1000. The descriptor 1000 includes a DT (Descriptor Type), a DIE (Descriptor Interrupt Enable), an MSC (MAC Status Code), a PS (Padding Selection), an EI (Error Indication), a TR (Truncation Indication), a DS (Data Size), a FIN (Final part of Rx-frame), a JDS (Just Data Size), and a DPTR (Data Pointer).

The DT represents completion/incomplete processing, error, and other states defined by the descriptor 1000. The DT may include type information of data to be processed. The DIE represents a setting for enabling/disabling an interrupt in a transfer process defined by the descriptor 1000. The MSC represents an error code received from the media access controller 802. PS represents data for making frames less than the minimum standard size a prescribed size.

EI represents error information at the time of data transfer. TR represents information indicating that the frame has been discarded due to a reception error or the like. The FIN represents information indicating that the descriptor 1000 is a descriptor for processing the last data of the divided frame.

JDS represents a flag for error determination of the last data of a frame. The JDS error determination flag may include, for example, the following two types. (Error judgment 1) "If the size of the last data is within the size specified in DS, it is judged that it is normal, and if not, it is judged that it is an error". (Error determination 2) "If the size of the final data matches the size specified in the DS, it is determined that the data is normal, and if not, it is determined that the data is in error." DPTR refers to the addresses in the memories to which the data is to be transferred. The memory control unit 805 refers to DPTR and executes a process of "transferring subsequent data to addresses in the memory defined by DPTR". Note that the format of the descriptor 1000 shown in FIG. 10 is an example, and the items that can be set by the descriptor 1000 are not limited to these.

As described above, according to the communication apparatus 101 of the present embodiment, the memory control unit 805 can immediately detect an error on a frame-by-frame basis by referring to the last data flag set in the descriptor. As a result, the communication device 101 does not require to allocate CPU810 resources for error-detection processing, and the processing performance of the communication apparatus 101 is improved.

Next, processing of the communication apparatus 101 according to the second embodiment will be described. The second embodiment differs from the first embodiment described above in that one descriptor includes a plurality of transfer rules for data included in a frame. The hardware configuration of the communication device 101 according to the second embodiment is the same as that of the communication apparatus 101 of the first embodiment. Therefore, description of the same configuration will not be repeated.

Figure 11:
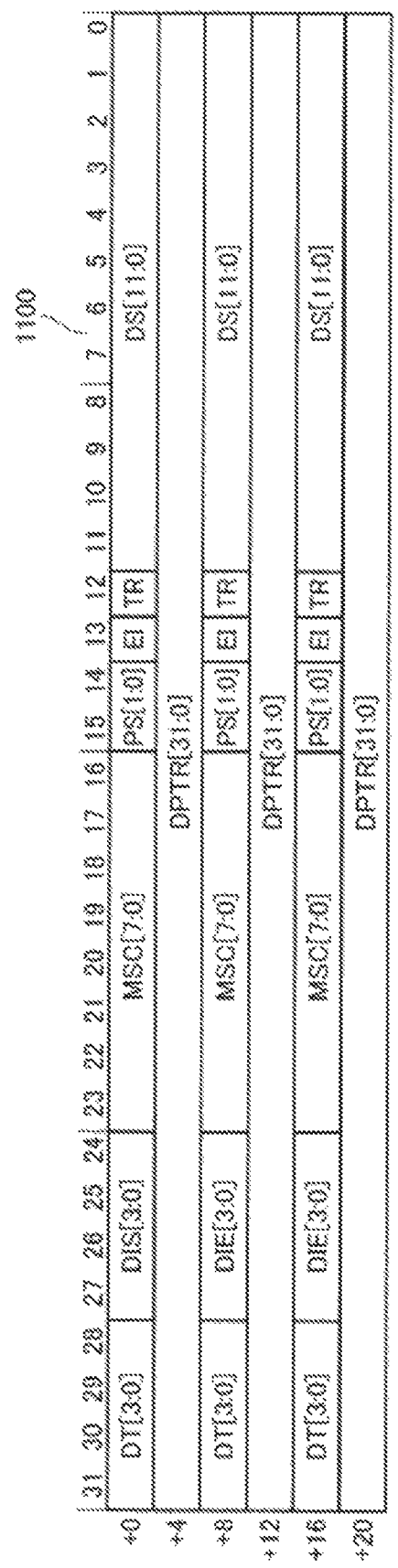
FIG. 11 is a diagram showing an example of the format of the descriptor 1100.

FIG. 11 is a diagram showing an example of the format of the descriptor 1100. The transfer rule according to the present embodiment includes data defined by the descriptor 1100. The descriptor 1100 includes DTs, DIEs, MSCs, PSs, EIs, TRs, DSs, and DPTR as many as the number of data in a frame. The descriptor 1100 shown in FIG. 11 corresponds to a frame including three pieces of data. In certain aspects, descriptor 1100 may include any number of two or more data transfer rules.

By using the descriptor 1100, the memory control unit 805 can reduce the number of references to the descriptor chain 812. The case where the frame includes three pieces of data will be described as an example.

In the case of transfer processing using the descriptor 1000, since the descriptor 1000 includes only one data transfer rule, the memory control unit 805 needs to refer to the descriptor chain 812 three times in order to transfer all the data in the frame.

On the other hand, in the case of transfer processing using the descriptor 1100, since the descriptor 1100 includes three data transfer rules, the memory control unit 805 only needs to refer to the descriptor chain 812 once in order to transfer all the data in the frame. Therefore, in the transfer processing using the descriptor 1100, the memory control unit 805 can omit the step S955 and the step S975 in the processing of FIG. 9. In step S955,S970,S990, the memory control unit 805 stores the transfer result in the same descriptor.

Further, by using the descriptor 1100, the memory control unit 805 can quickly detect a frame loss as compared with the case of using the descriptor 1000 according to the first embodiment. The case where the frame includes three pieces of data will be described as an example.

The memory control unit 805 refers to the descriptor chain 812 once to acquire transfer rules for all data included in the frame. The memory control unit 805 can obtain information on the number of data included in the frame and the size of each data based on the transfer rule. When storing the frame in the memory 806, the memory control unit 805 can determine whether or not the next data acquired from the memory 806 is the head data and the last data by using the determination information added to the frame.

Therefore, together with the error determination illustrated in FIG. 9, when the data to be transferred next, which is defined in the transfer rule, is not the last data of the frame and the next data is the last data of the frame, the memory control unit 805 can determine that a loss has occurred in the data and output an error.

In the error processing, the memory control unit 805 may store a transfer result including an error in the descriptor 1100, may output an error interrupt signal, or may execute both of these processes.

As described above, according to the communication apparatus 101 of the present embodiment, the memory control unit 805 can reduce the number of reference times of the descriptor chain by referring to the descriptor defining the transfer rule for a plurality of data included in the frame, and can detect the loss of the frame at an early stage.

Next, processing of the communication apparatus 101 according to the third embodiment will be described. The third embodiment differs from the first and second embodiments described above in that the descriptor includes position information in a frame of data to be processed. The hardware configuration of the communication apparatus 101 according to the third embodiment is the same as that of the communication apparatuses 101 of the first and second embodiments. Therefore, description of the same configuration will not be repeated.

Figure 12:
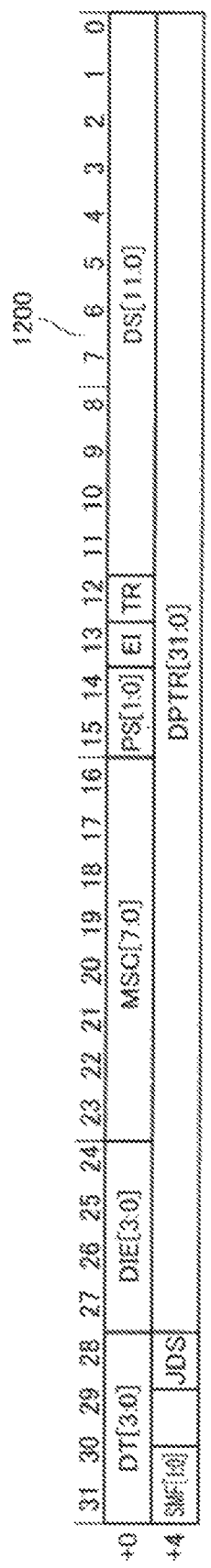
FIG. 12 is a diagram showing an example of the format of the descriptor 1200.

FIG. 12 is a diagram showing an example of the format of the descriptor 1200. The transfer rule according to the present embodiment includes data defined by the descriptor 1200. The descriptor 1200 includes DTs, DIEs, MSCs, PSs, EIs, TRs, DSs, SMFs (Start or Middle or Final part of Rx-frame), JDSs, and DPTR.

The SMF defines a position in a frame of data to be processed. The position "Start" means that the data to be processed is the head data of the frame. The position "Middle" means that the data to be processed is data at an intermediate position which is neither the head nor the end of the frame. The position "Final" means that the data to be processed is the last data of the frame.

By using the descriptor 1200, the memory control unit 805 can quickly detect a frame loss as compared with the case of using the descriptor 1000 according to the first embodiment. By referring to the IMF included in the transfer rule, the memory control unit 805 can determine whether the data to be transferred next is the head data, the intermediate data, or the last data in the frame. When storing the frame in the memory 806, the memory control unit 805 can determine whether or not the next data is the head data and the last data by using the determination information added to the frame.

Therefore, together with the error determination illustrated in FIG. 9, when the position of the data to be transferred next, which is defined by the transfer rules, is "Start" or "Middle", and when the next data is the last data of the frame, the memory control unit 805 can determine that a loss has occurred in the data, and can output an error.

In addition to the error determination illustrated in FIG. 9, when the position of the data to be transferred next, which is defined by the transfer rules, is "Middle" or "Final", and when the next data is the head data of the frame, the memory control unit 805 can determine that a loss has occurred in the data, and can output an error.

In the error processing, the memory control unit 805 may store a transfer result including an error in a descriptor, may output an error interrupt signal, or may execute both of these processes.

Figure 13:
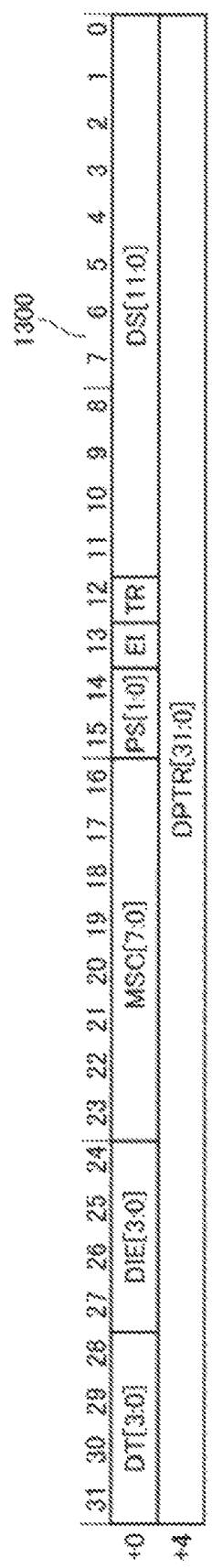
FIG. 13 is a diagram showing an example of the format of the descriptor 1300.

FIG. 13 is a diagram showing an example of the format of the descriptor 1300. The transfer rule according to the present embodiment may include data defined by the descriptor 1300 instead of the descriptor 1200. The descriptor 1300 includes DTs, DIEs, MSCs, PSs, EIs, TRs, DSs, and DPTR.

The descriptor 1300 distinguishes the last data in the frame from other data by changing the value of DT to represent a plurality of types of data. The memory control unit 805 can determine whether or not the data to be processed is the last data in the frame by referring to the DT of the descriptor 1300.

With the use of the descriptor 1300, the memory control unit 805 can determine that a loss has occurred in the data and output an error when the DT of the transfer rule does not indicate the last data and the next data is the last data of the frame, together with the error determination illustrated in FIG. 9.

In the error processing, the memory control unit 805 may store a transfer result including an error in a descriptor, may output an error interrupt signal, or may execute both of these processes.

As described above, according to the communication apparatus 101 of the present embodiment, the memory control unit 805 can detect a frame loss at an early stage by referring to the descriptor defining the position in the frame of the data to be processed.

Next, processing of the communication apparatus 101 according to the fourth embodiment will be described. The fourth embodiment differs from the above-mentioned first to third embodiments in that the frame includes a header code and a tail code of each data included in the frame. The hardware configuration of the communication device 101 according to the fourth embodiment is the same as that of the communication apparatus 101 of the first to third embodiments. Therefore, description of the same configuration will not be repeated.

Figure 14:
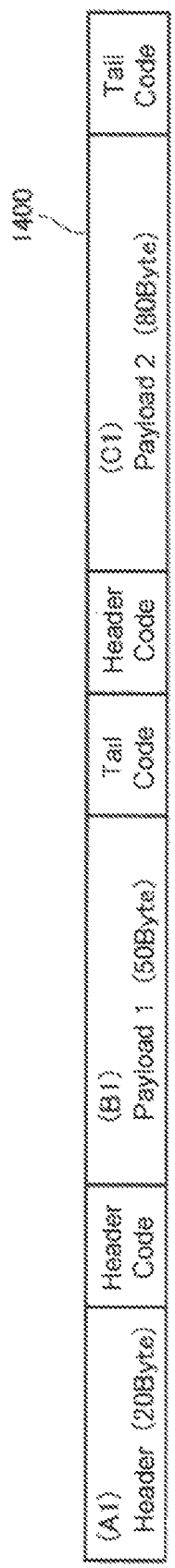
FIG. 14 is a diagram showing an example of the format of the frame 1400.

FIG. 14 is a diagram showing an example of the format of the frame 1400. The frame 1400 includes a header code and a tail code before and after all payloads included in the frame 1400. In the example of FIG. 14, the frame 1400 includes payloads B1 and C1, and further includes header codes and tail codes before and after the payloads B1 and C1, respectively. The header code and the tail code may include the size of the payload and the identification code. The header A1 is a header of the frame 1400.

The memory control unit 805 can acquire the size of the next data acquired from the memory 806 and the identification information of the payload by referring to the header code and the tail code of the frame 1400. Therefore, when retrieving the next data from the memory 806, the memory control unit 805 can compare the size and identification information of the next data with the size, DT, and the like defined in the transfer rule, and output an error when the type and size of the data do not match.

Figure 15:
FIG. 15 is a diagram showing an example of the format of the frame 1500.

FIG. 15 is a diagram showing an example of the format of the frame 1500. The frame 1500 is different from the frame 1400 in that an element identification code is added to the payload instead of the header code.

The memory control unit 805 can acquire the size of the next data acquired from the memory 806 and the identification information of the payload by referring to the element identification code and the tail code of the frame 1500. Therefore, when retrieving the next data from the memory 806, the memory control unit 805 can compare the size and header code of the next data with the size and DT defined in the transfer rule, and output an error when the type and size of the data do not match.

Figure 16:
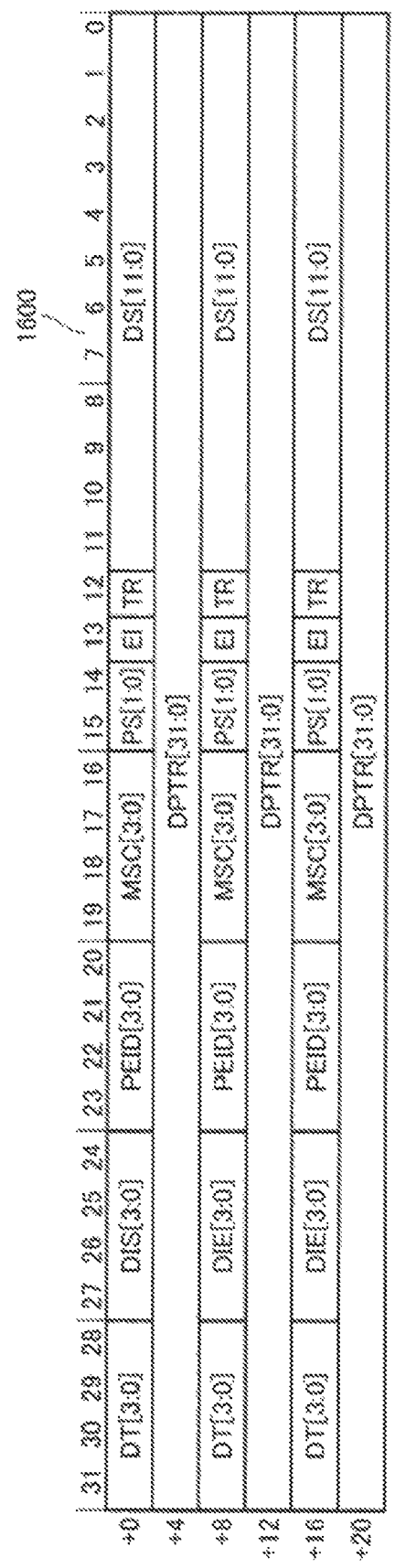
FIG. 16 is a diagram showing an example of the format of the descriptor 1600.

FIG. 16 is a diagram showing an example of the format of the descriptor 1600. The transfer rule according to the present embodiment may include data defined by the descriptor 1600 instead of the descriptor 1000. The descriptor 1600 is obtained by adding PEID (Packet Element Identification) to the descriptor 1100.

PEID is an identification code of the data to be processed, and corresponds to the header code of FIG. 14 and the element identification code of FIG. 15. The descriptor 1600 is referred to by the memory control unit 805 together with the frame 1400 or the frame 1500.

By referring to the frame 1400 or the frame 1500, the memory control unit 805 can acquire the size and identification information of the next data when the next data is retrieved from the memory 806. The memory control unit 805 can compare the size and identification information of the next data with the size, DT, and the like defined in the transfer rule of the descriptor 1600, and output an error when the type and size of the data do not coincide with each other.

Further, the memory control unit 805 can acquire the size and identification information of all the data in the frame by referring to the descriptor 1600. Therefore, the memory control unit 805 can determine whether or not each data in the frame is normal by checking the identification information and the size of the subsequent data acquired from the memory 806 with PEID, the DS, and the like of the descriptor 1600. Therefore, even if some data of a frame is lost, the memory control unit 805 can transfer only other normal data to the memory 809 without deleting all of the frames.

As described above, according to the communication apparatus 101 of the present embodiment, the memory control unit 805 refers to the header code, the tail code, and the like before and after the payload of the frame. Further, the memory control unit 805 can detect missing frames at an early stage by comparing these header codes and tail codes and the like with DT, PEID, DS, and the like of the descriptor.

Although the invention made by the present inventor has been specifically described based on the embodiment, the present invention is not limited to the above embodiment, and it is needless to say that various modifications can be made without departing from the gist thereof.

What is claimed is:

1. A communication device comprising:
a receiving circuit configured to receive a communication frame, the communication frame including a plurality of data; and
a first memory configured to temporarily store the plurality of data;
a second memory configured to store transferring rules corresponding to the plurality of data;
a plurality of third memories each of which is configured to be assigned to each of the plurality of data;
a plurality of processors each of which is configured to process the plurality of data assigned with the corresponding one of the third memories; and
a memory control circuit configured to distribute each of the plurality of data to each of the plurality of third memories in order from a head thereof,
wherein the memory control circuit is further configured to:
(a) obtain first data from the first memory;
(b) obtain second data from the second memory, the second data defining a size of data to be subsequently transferred to one of the plurality of third memories;
(c) when the second data includes a final data flag and when the first data is the final data of the communication frame, and the size of the first data is within the size defined in the second data, transfer the first data to any one of the plurality of third memories;
(d) when the second data includes the final data flag and when the first data is not the final data of the communication frame or the size of the first data is larger than the size specified in the second data, output an error;
(e) when storing the plurality of the data to the first memory, generate determination information to determine a trailing position of the plurality of data in the first memory;
(f) add the determination information to an end of the plurality of data and storing it in the first memory; and
(g) when the data retrieved from the first memory including the determination information, determine that the data retrieved from the first memory is the final data of the communication frame, and
wherein the second memory includes a chain of a plurality of file descriptors, and wherein the second data is one of the plurality of file descriptors.

2. The communication device according to claim 1, further comprising a data filter circuit determining a type of the received communication frame,
wherein the transferring rules are defined for each type of the communication frame, and
wherein the memory control circuit is configured to refer an address of the second memory associated with an identifier of the communication frame obtained from the data filter circuit.

3. The communication device according to claim 2, wherein the memory control circuit is configured to:
(h) store the determination information to a fourth memory; and
(i) refer to the fourth memory when retrieving data from the first memory, and determine whether the data retrieved from the first memory is the final data of the communication frame.

4. The communication device according to claim 1, wherein the memory control circuit is further configured to:
(h) count the size of the data retrieved from the first memory; and
(i) when the data retrieved from the first memory is the final data of the frame, calculate the size of the data retrieved from the first memory based on the determination information and the counted size.

5. The communication device according to claim 1, wherein the memory control circuit is further configured to:
h store the error to the second memory.

6. The communication device according to claim 1, wherein the error is an error interrupt signal, and wherein the memory control circuit is further configured to:
h halt the processor by generating the error interrupt signal.

7. The communication device according to claim 1, further comprising a fifth memory configured to store a program to store the chain of the plurality of file descriptors to the second memory,
wherein one of the plurality of the processors is configured to:
(i) refer the fifth memory after start-up of the communication device; and
(ii) store the chain of the plurality of the file descriptors to the second memory based on the program stored in the fifth memory.

* * * * *